(12) United States Patent
Mathur

(10) Patent No.: US 12,360,605 B2
(45) Date of Patent: Jul. 15, 2025

(54) GESTURE CONTROL OF A DATA PROCESSING APPARATUS

(71) Applicant: Nokia Technologies Oy, Espoo (FI)

(72) Inventor: Akhil Mathur, London (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/954,861

(22) PCT Filed: Dec. 10, 2018

(86) PCT No.: PCT/EP2018/084089
§ 371 (c)(1),
(2) Date: Jun. 17, 2020

(87) PCT Pub. No.: WO2019/121081
PCT Pub. Date: Jun. 27, 2019

(65) Prior Publication Data
US 2021/0089132 A1 Mar. 25, 2021

(30) Foreign Application Priority Data

Dec. 20, 2017 (EP) ..................................... 17208863

(51) Int. Cl.
*G06F 3/01* (2006.01)
*G06F 1/16* (2006.01)
(Continued)

(52) U.S. Cl.
CPC .............. *G06F 3/017* (2013.01); *G06F 1/163* (2013.01); *G06F 3/0304* (2013.01); *G06F 3/044* (2013.01)

(58) Field of Classification Search
None
See application file for complete search history.

(56) References Cited

U.S. PATENT DOCUMENTS 9,111,135 B2 * 8/2015 Hummel .............. G06V 40/107
9,201,585 B1 12/2015 Karakotsios et al.
(Continued)

FOREIGN PATENT DOCUMENTS

CN 103631501 A 3/2014
CN 103929464 A 7/2014
(Continued)

OTHER PUBLICATIONS

Kratz et al., "Hoverflow: Expanding the Design Space of Around-device Interaction", Proceedings of the 11th Conference on Human-Computer Interaction with Mobile Devices and Services, Sep. 15-18, 2009, 8 pages.
(Continued)

*Primary Examiner* — William L Bashore
*Assistant Examiner* — Koorosh Nehchiri
(74) *Attorney, Agent, or Firm* — ALSTON & BIRD LLP

(57) ABSTRACT

A method and system is disclosed that comprises detecting a user gesture at a location which is remote from a data processing terminal and identifying a first application based on the distance of the detected user gesture being within a first distance range from the data processing terminal, wherein a plurality of applications are associated with different distance ranges from the data processing terminal. The method and system may further cause performance of one of a plurality of functions of the first application based on the user gesture.

19 Claims, 6 Drawing Sheets

(51) Int. Cl.
*G06F 3/03* (2006.01)
*G06F 3/044* (2006.01)

(56) References Cited

U.S. PATENT DOCUMENTS

| | | | |
|---|---|---|---|
| 9,310,891 B2* | 4/2016 | Rafii | G02B 27/017 |
| 9,323,353 B1 | 4/2016 | Sivertsen | |
| 9,430,112 B2 | 8/2016 | Tokutake | |
| 9,459,697 B2* | 10/2016 | Bedikian | G06F 3/0325 |
| 9,489,500 B2 | 11/2016 | Takenaka et al. | |
| 9,538,115 B2 | 1/2017 | Nakade et al. | |
| 9,886,095 B2* | 2/2018 | Pothier | G01S 17/58 |
| 9,910,499 B2 | 3/2018 | Adzhigirey et al. | |
| 10,146,323 B1* | 12/2018 | Keyes | G06F 3/038 |
| 10,553,048 B2* | 2/2020 | McLear | H04B 1/385 |
| 10,936,537 B2* | 3/2021 | Huston | G06T 19/006 |
| 2002/0138767 A1 | 9/2002 | Hamid et al. | |
| 2005/0110964 A1 | 5/2005 | Bell et al. | |
| 2010/0151946 A1* | 6/2010 | Wilson | G06T 7/593 |
| | | | 463/43 |
| 2010/0199232 A1* | 8/2010 | Mistry | G06F 3/0425 |
| | | | 715/863 |
| 2011/0119640 A1* | 5/2011 | Berkes | G06F 3/0304 |
| | | | 715/863 |
| 2011/0175822 A1* | 7/2011 | Poon | H04W 4/023 |
| | | | 345/173 |
| 2012/0081317 A1* | 4/2012 | Sirpal | G06F 3/048 |
| | | | 345/173 |
| 2012/0323521 A1* | 12/2012 | De Foras | G06F 3/0346 |
| | | | 702/141 |
| 2012/0327125 A1* | 12/2012 | Kutliroff | G06F 3/011 |
| | | | 345/660 |
| 2013/0147793 A1 | 6/2013 | Jeon et al. | |
| 2013/0222270 A1* | 8/2013 | Winkler | H04M 1/0283 |
| | | | 345/173 |
| 2013/0227418 A1* | 8/2013 | Sa | G06F 3/017 |
| | | | 715/728 |
| 2013/0278706 A1 | 10/2013 | Connelly et al. | |
| 2014/0081160 A1 | 3/2014 | Xiang | |
| 2014/0267094 A1 | 9/2014 | Hwang et al. | |
| 2014/0282275 A1* | 9/2014 | Everitt | G06F 3/017 |
| | | | 715/863 |
| 2014/0368412 A1* | 12/2014 | Jacobsen | G06F 3/167 |
| | | | 345/8 |
| 2015/0067590 A1* | 3/2015 | Lee | G06F 3/0484 |
| | | | 715/803 |
| 2015/0100926 A1* | 4/2015 | Berkes | G06K 9/00335 |
| | | | 715/863 |
| 2015/0169176 A1* | 6/2015 | Cohen | G06F 3/04815 |
| | | | 715/852 |
| 2015/0177939 A1* | 6/2015 | Anderson | G06F 3/017 |
| | | | 715/745 |
| 2015/0185841 A1* | 7/2015 | Levesque | G06F 1/1639 |
| | | | 715/702 |
| 2015/0370411 A1 | 12/2015 | Patel et al. | |
| 2016/0018948 A1* | 1/2016 | Parvarandeh | G06F 1/163 |
| | | | 345/175 |
| 2016/0124514 A1 | 5/2016 | Cha et al. | |
| 2016/0139662 A1* | 5/2016 | Dabhade | G06F 1/1686 |
| | | | 345/156 |
| 2016/0357368 A1* | 12/2016 | Federighi | G06F 3/0485 |
| 2017/0168630 A1* | 6/2017 | Khoshkava | G06F 1/163 |
| 2018/0046258 A1* | 2/2018 | Poupyrev | G01S 13/88 |
| 2018/0292970 A1 | 10/2018 | Suzuki et al. | |
| 2019/0025927 A1* | 1/2019 | Cudak | G06F 3/04883 |

FOREIGN PATENT DOCUMENTS

| | | | |
|---|---|---|---|
| CN | 105302302 A | | 2/2016 |
| CN | 106527685 A | | 3/2017 |
| CN | 106909297 A | | 6/2017 |
| CN | 105302302 B | * | 2/2019 |
| EP | 3179340 A1 | | 6/2017 |
| WO | WO 2015/134288 A1 | | 9/2015 |

OTHER PUBLICATIONS

Extended European Search Report received for corresponding European Patent Application No. 17208863.5, dated Jun. 14, 2018, 7 pages.

International Search Report and Written Opinion received for corresponding Patent Cooperation Treaty Application No. PCT/EP2018/084089, dated Feb. 13, 2019, 12 pages.

Office action received for corresponding European Patent Application No. 17208863.5, dated Dec. 11, 2020, 6 pages.

Office Action for European Application No. 17208863.5 dated Mar. 25, 2022.

Office Action for European Application No. 17208863.5 dated Aug. 28, 2023, 6 pages.

Office Action for Chinese Application No. 201880087512.2 dated Oct. 21, 2023, 22 pages.

Office Action for Chinese Application No. 201880087512.2 dated Feb. 15, 2023, 11 pages.

Office Action for Chinese Application No. 201880087512.2 dated Feb. 29, 2024, 23 pages.

Intention to Grant for European Application No. 17208863.5 dated Dec. 9, 2024, 34 pages.

Office Action for Chinese Application No. 201880087512.2 dated Sep. 27, 2024, 22 pages.

Decision to grant a European patent Mailed on Apr. 17, 2025 for EP Application No. 17208863, 2 page(s).

* cited by examiner

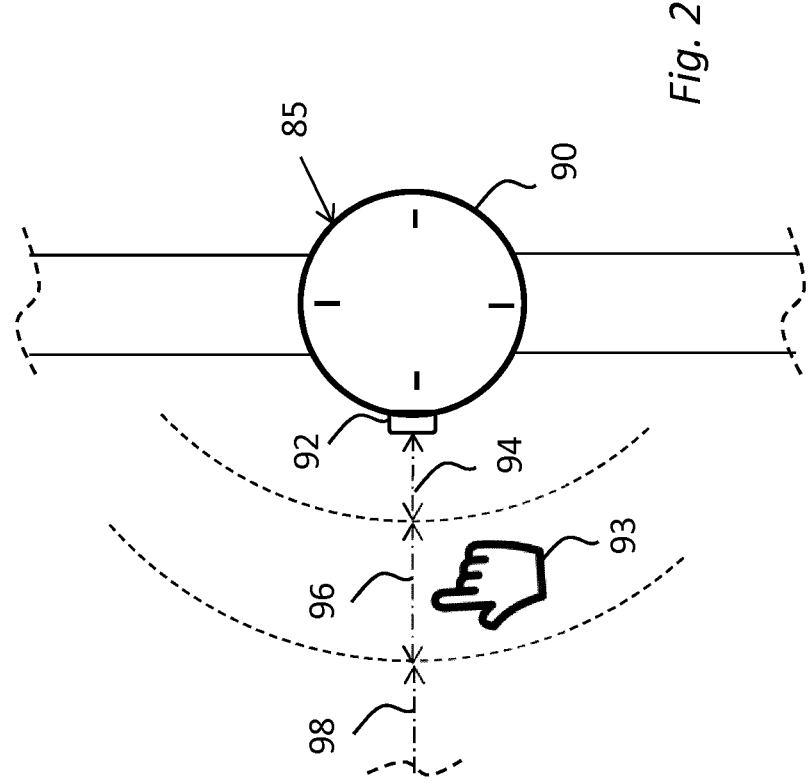
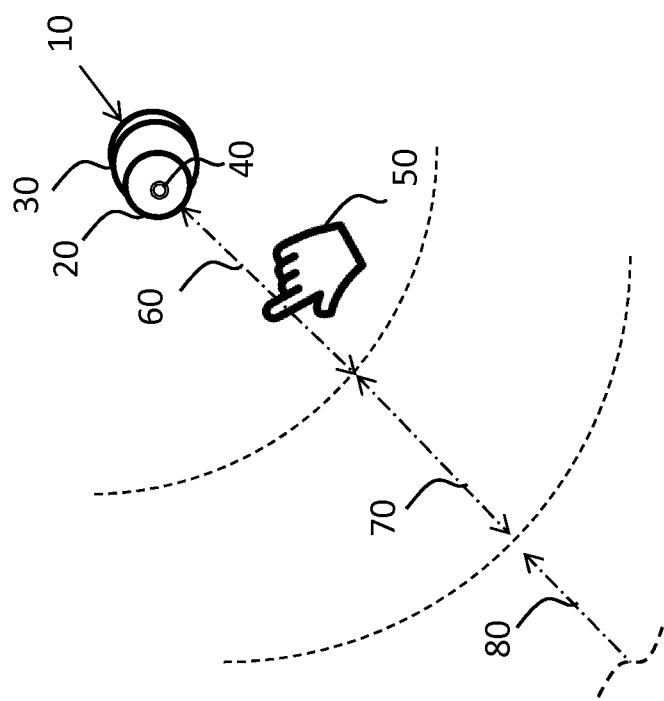

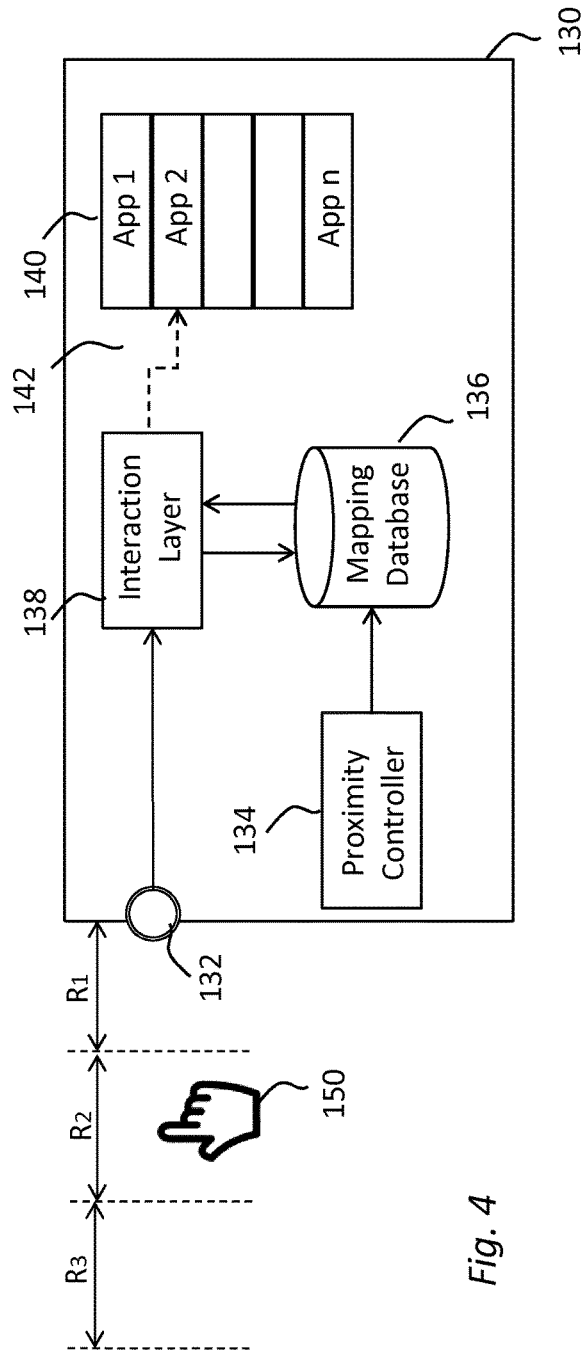

Fig. 4

| Range | Application | Gesture | Function |
|---|---|---|---|
| 0.1 – 2cm R1 | Music App1 | Tap Vertical Swipe Horizontal Swipe etc. | Enable/Play/Pause Volume Up/Down Next/Previous Track etc. |
| 2 – 4 cm R2 | Voice Calls App2 | Tap Vertical Swipe Horizontal Swipe etc. | Enable/Answer/End Call Volume Up/Down Next/Previous Contact etc. |
| 4 – 6 cm R3 | Health App3 | Tap Vertical Swipe Horizontal Swipe etc. | Enable/Disable Activity Selector Date Selector etc. |
| etc. | etc. | | |

Fig. 5

GESTURE CONTROL OF A DATA PROCESSING APPARATUS

FIELD

This disclosure relates to gesture control of a data processing apparatus, particularly, though not exclusively, a wearable data processing apparatus.

BACKGROUND

Data processing apparatuses having a small form-factor are become increasingly popular. For example, wearable devices such as wireless earphones, earbuds and smartwatches are now relatively common. Other examples include apparatuses associated with the so-called Internet-of-Things (IoT). The small form-factor of such apparatuses means that it can be difficult to control different types of functionality in the same way that, for example, larger touch screen devices can offer.

For example, a Bluetooth earbud may only have sufficient surface area for a single physical control button. This limits the different types of functionality that might be applicable to the earbud. The user may have to resort to their associated media player to manually select or control different applications and the different types of functionality on the different applications, which is cumbersome.

SUMMARY

A first aspect provides an apparatus, comprising: means for receiving data indicative of a detected user gesture at a location which is remote from a data processing terminal; means for identifying a first application based on the distance of the detected user gesture being within a first distance range from the data processing terminal, wherein a plurality of applications are associated with different distance ranges from the data processing terminal; and means for causing performance of one of a plurality of functions of the first application based on the user gesture.

The apparatus may further comprise: means for detecting another remote user gesture at a distance within a second range from the data processing terminal; means for identifying a second application, different from the first application, based on the distance being within the second range; and means for causing performance of one of a plurality of functions of the second application based on the user gesture.

The different distance ranges may be substantially non-overlapping.

The means for causing performance of the one of said plurality of functions may be arranged to identify a type of the detected user gesture and determine which of a plurality of predetermined functions associated with the identified application correspond to said identified gesture type, which determined function is then caused to be performed.

In the event that a predetermined gesture moves from the first distance range, into a different distance range, a data transfer function may be performed between the associated applications.

In the event that a predetermined gesture corresponds to a sharing function, a data transfer function may be performed between the associated application and an application associated with another data processing terminal in proximity.

The association between different ones of the plurality of applications and the different distance ranges may be updated dynamically. The association may be dynamically updated by assigning to a predetermined one of the different distance ranges the most frequently and/or recently used application. The predetermined one of the different distance ranges may be that which is closest to the data processing terminal.

The apparatus may be a data processing terminal. For example, the apparatus may be a wearable data processing terminal. The apparatus may comprises one of an earphone, headphones and watch. For example, where the apparatus is an earphone or headphone, they may be further configured to issue an audio notification to confirm the function and/or related parameters of the function.

The means for causing performance of the function may be arranged to issue a corresponding instruction to a further data terminal to which the wearable data processing terminal is proximate.

The means for detecting the user gesture may be by means of capacitive sensing using one or more capacitive sensors of the data processing terminal. An array of sensors may be used in some cases.

Another aspect provides a method comprising: receiving data indicative of a detected user gesture at a location which is remote from a data processing terminal; identifying a first application based on the distance of the detected user gesture being within a first distance range from the data processing terminal, wherein a plurality of applications are associated with different distance ranges from the data processing terminal; and causing performance of one of a plurality of functions of the first application based on the user gesture. Preferred features of the first aspect may also be applied to this aspect.

Another aspect provides a computer-readable medium comprising computer program code stored thereon, the computer readable medium and computer program code being configured to, when run on at least one processor: to receive data indicative of a detected user gesture at a location which is remote from a data processing terminal; to identify a first application based on the distance of the detected user gesture being within a first distance range from the data processing terminal, wherein a plurality of applications are associated with different distance ranges from the data processing terminal; and to cause performance of one of a plurality of functions of the first application based on the user gesture. Preferred features of the first aspect may also be applied to this aspect.

Another aspect provides a non-transitory computer-readable medium having stored thereon computer-readable code, which, when executed by at least one processor, causes the at least one processor to perform a method, comprising: receiving data indicative of a detected user gesture at a location which is remote from a data processing terminal; identifying a first application based on the distance of the detected user gesture being within a first distance range from the data processing terminal, wherein a plurality of applications are associated with different distance ranges from the data processing terminal; and causing performance of one of a plurality of functions of the first application based on the user gesture. Preferred features of the first aspect may also be applied to this aspect.

Another aspect provides an apparatus, the apparatus having at least one processor and at least one memory having computer-readable code stored thereon which when executed controls the at least one processor: to receive data indicative of a detected user gesture at a location which is remote from a data processing terminal; to identify a first application based on the distance of the detected user gesture being within a first distance range from the data processing terminal, wherein a plurality of applications are associated with different distance ranges from the data processing terminal; and to cause performance of one of a plurality of functions of the first application based on the user gesture. Preferred features of the first aspect may also be applied to this aspect.

BRIEF DESCRIPTION OF DRAWINGS

Embodiments will now be described, by way of non-limiting example, with reference to the accompanying drawings, in which:

FIG. 1 is a schematic view of a user gesture, remote from a first apparatus, within one of a plurality of ranges of the apparatus for controlling a function according to some embodiments;

FIG. 2 is a schematic view of a user gesture, remote from a second apparatus, within one of a plurality of ranges of the apparatus for controlling a function according to some embodiments;

FIG. 4 is a schematic diagram of functional components of the FIG. 1 or FIG. 2 apparatuses according to some embodiments;

FIG. 5 is an example of a mapping database shown in FIG. 4 according to some embodiments;

DETAILED DESCRIPTION

Figure 3:
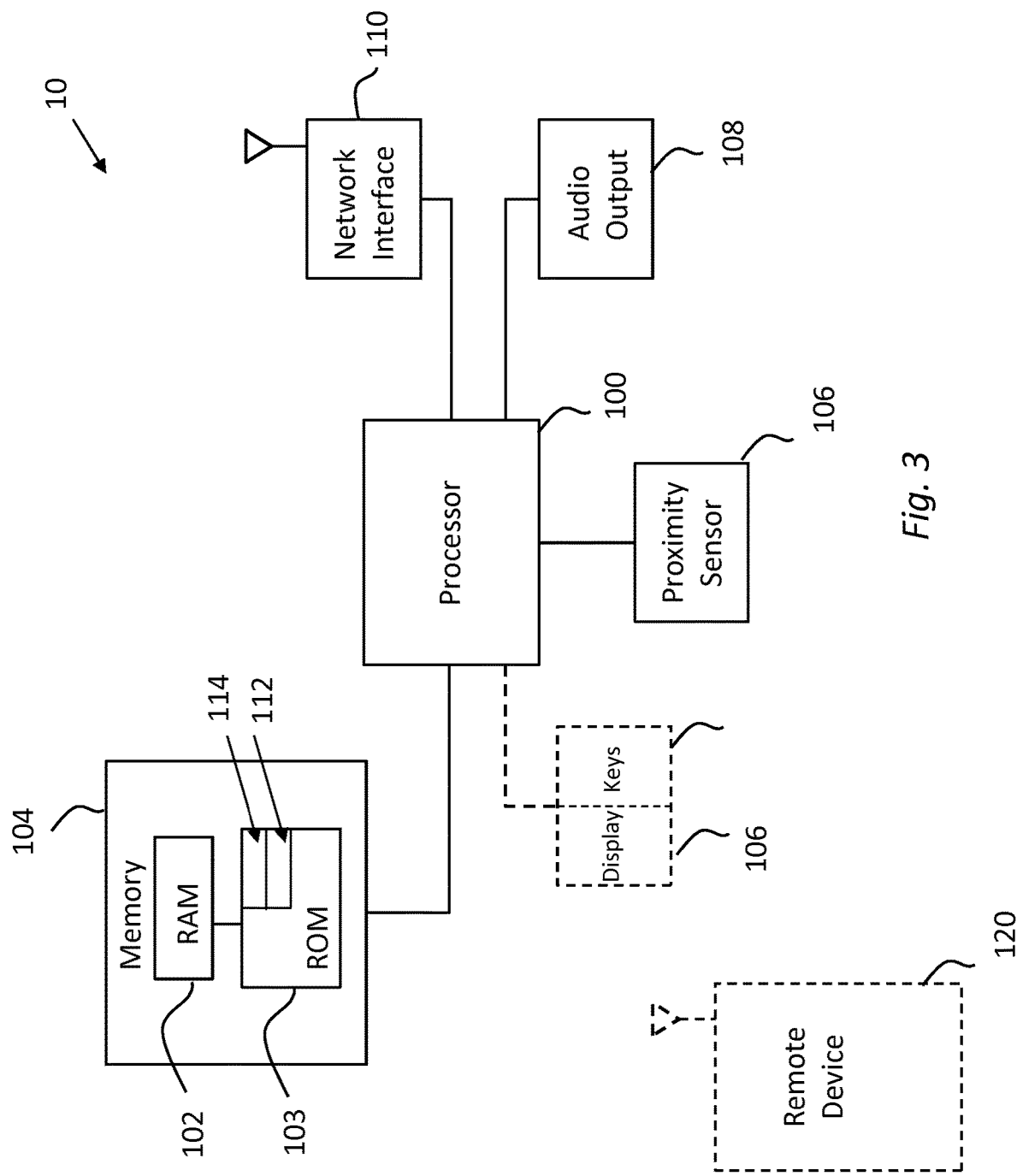
FIG. 3 is a schematic diagram of hardware components of the FIG. 1 or FIG. 2 apparatuses according to some embodiments.

Embodiments herein relate to methods and systems for gesture control of a data processing apparatus or terminal, which may be a wearable data processing terminal or indeed any other type of data processing terminal, which typically but not exclusively will be portable and/or wireless.

For example, embodiments may relate to methods and systems for gesture control of a wearable data processing terminal such as one or more of earphones, earbuds, headphones or other forms of wearable audio terminal comprising a speaker for placement adjacent one or more user's ears. For example, an embodiment described later on relates to a wireless earbud which may communicate with an associated other terminal such as a media player, smartphone or tablet computer. The method of communication may be wireless, e.g. using Bluetooth or a similar wireless protocol.

For example, in other embodiments, the wearable data processing terminal may be a limb-worn device such as a smartwatch or similar. Similarly, the smartwatch may be in communication with an associated other terminal such as a media player, smartphone or tablet computer. The method of communication may be wireless, e.g. using Bluetooth or a similar wireless protocol.

The use and popularity of such wearable data processing terminals continues to grow. They provide a convenient manner of accessing one or more applications, and functionality associated with such applications, particularly if the user is travelling or involved in physical activity, for example.

Such applications may comprise one or more of a music or another audio-playing application, a health monitoring application, a voice call application, a text or multimedia communications application, a speech-recognition application, a podcast application and so on.

For the avoidance of doubt, an application in the context of this disclosure comprises any computer program or computer program type providing a distinct group of functions, such as a music application, a health monitoring application, a voice telephony application, a text or multimedia messaging application, a speech-recognition application, a podcasting application, etc. The term may therefore be considered broader than referring to a specific software application. For example, in some embodiments, there may be two distinct software applications providing music, but they may have common music playing functionality such as enable, disable, play, pause, stop, rewind, forward, next track, previous track, volume up, volume down etc.

In some embodiments, the wearable apparatus may comprise a processor and memory providing one or more applications, such as those mentioned above. In other embodiments, the wearable apparatus may communicate wirelessly with another data processing apparatus, such as a smartphone or tablet computer, which provides the aforementioned applications and functionality, the output from which is relayed back to the wearable apparatus. In this case, the wearable apparatus is in signal communication with the other data processing apparatus.

A problem with certain data processing terminals, particularly but not exclusively wearable terminals, is that they have a small form factor. This limits how users may interact with the data processing terminal or another data processing apparatus with which it is in signal communication. For example, there may be limited space for buttons or switches to be able to input commands for the various types of functions that may be associated with the different applications. It is generally not practicable to have touch screens on such data processing terminals due to their size and the additional expense.

Furthermore, it is difficult to switch between different applications. For example, a user listening to music may wish to interact with a health monitoring application to measure heart rate at a current time. This ordinarily requires the user to get out their mobile phone or tablet computer, close or minimise to background the music application and open the health monitoring application manually.

The use of voice commands for interaction with such data processing terminals is disadvantageous due to background noise and interference, and its potential to disturb others.

Accordingly, embodiments herein relate to the detection and interpretation of physical user gestures made remotely from the data processing terminal; that is gestures which do not touch the data processing terminal.

Such gestures may be detected using capacitive coupling, which is a known technology. In some embodiments, a single capacitive sensor may be provided in or on the data processing terminal. In other embodiments, an array comprised of a plurality of capacitive sensors may be provided, for determining more accurately the spatial location of user gestures relative to the data processing terminal.

In overview, embodiments involve assigning or associating applications to respective distance ranges relative to the data processing terminal. Typically, the distance ranges are non-overlapping, so that a first range (e.g. that nearest to the data processing terminal) is associated with a first application and another range (e.g. beyond the first range) is associated with a different application. In some embodiments, the ranges may overlap, as will be briefly mentioned later on.

Particular gestures made within said ranges are further associated with corresponding functionality for those applications, and hence a distinction can be made between a first gesture made in the first range, a second gesture made in the first range, a first gesture made in a second range and a second gesture made in the second range, and so on. This means that the user can control multiple different applications with multiple different functions based on what gesture they make and where, relative to the data processing terminal.

Further, the user does not necessarily need to manually switch between different applications. The methods and systems provide a more intuitive way of interacting with applications.

In some embodiments, the associations between distance ranges and applications are predefined, which can be factory set, or performed by the user and/or updated by the user.

The associations may be fixed or they may change dynamically.

For example, the associations may be updated dynamically so that a particular application which has been used most recently is associated with a particular distance range, for example that which is closest to the data processing terminal. In other embodiments, the particular application which has been used most frequently, for example over a predetermined time range, may be associated with the particular distance range. Other rules may be applied.

In some embodiments, where the data processing terminal emits audio, for example if it is an earbud or a set of headphones, a detected gesture may cause audio confirmation of the associated function currently selected, e.g. "playing audio" or "monitoring heart rate." In some embodiments, a confirmation of which range an expected gesture is within may be provided. For example, if a user's hand is within a second range, then prior to detecting any particular gesture, an audio confirmation of the application may be produced, e.g. "music player." This prevents accidental control of the incorrect application, which may be particularly useful if dynamic updating is used.

Referring to FIG. 1, for example, a wireless earbud 10 is shown comprising a body 20 and a flexible tip 30 for insertion into a human ear. The body 20 comprises a system to be explained below, including a radio frequency (RF) transceiver for communication with an associated media player, smartphone or tablet computer. The transceiver may be a Bluetooth transceiver, for example. The earbud 10 further comprises within the body 20 a capacitive sensor 40 which forms part of the system for sensing user gestures in proximity to the sensor; it will be appreciated that the sensor will produce a signal indicative of the distance of the user gesture from the sensor, and hence the earbud, and also a gesture type.

For example, the gesture type may be a tap gesture, comprising a sharp movement of the finger in mid-air. Another gesture type may be a swiping gesture, comprising of a smooth movement in mid-air. A distinction may be made between horizontal and vertical swipes. Other gesture types may comprise one or more of flicking, arcuate, circular or pointing gestures, for example. The use of different numbers of fingers or other parts of the body may relate to other gestures, which may be distinguished from one another. For example a tap gesture made with two fingers may be distinguished over a tap gesture made with one finger.

More accurate gesture recognition may be achieved using multiple capacitive sensors, which may be arranged in an array within or on the earbud 10. These permit a more volumetric sensing of distance and gesture type.

In the shown example, a user's hand 50 is represented in proximity to the earbud 10, but remote therefrom. The user's hand 50 represents a gesture.

In accordance with embodiments herein, the detected distance from the earbud 10 determines which application the gesture relates to, based on one or more distance ranges (hereafter "ranges.") A first range is indicated by reference numeral 60, defining a first zone which may be omnidirectional around the earbud 10, or it may be segmented around the earbud. A second, non-overlapping range is indicated by reference numeral 70, defining a second, non-overlapping zone which may be omnidirectional around the earbud 10, or it may be segmented. The gesture 50 is shown in the first range 60, and hence the system of the earbud 10 will identify that this gesture relates to a first application. The type of gesture will determine what function is controlled. A gesture made in the second range 70 will be identified as relating to another application and, again, the type of gesture will determine what function is controlled of the other application.

A third range 80 is shown merely to indicate that any number of zones may be provided, at least within a distance that can be reliably sensed by the capacitive sensor 40.

In some embodiments, the sensor 40 senses gestures made in a limited volumetric space, i.e. not omnidirectional. For example, the sensor 40 may be configured to only sense gestures made within a predetermined cone-shaped volume extending outwards from the body 20 and away from the tip 30. Alternatively, the sensor 40 may be configured to only sense gestures substantially along a particular axis or segmented region of the surrounding area. For example, it may be undesirable to sense the region directly beneath the earbud 10 where the user's body will be.

FIG. 2 shows another embodiment which is a smartwatch 85. The smartwatch 85 comprises a main body 90 in which the system of the embodiments is housed, and may comprise a crown 92 which houses a capacitive sensor. In some embodiments, the crown 92 may be omitted in which case the sensor is housed within the main body 90. In a manner similar to the FIG. 1 embodiment, capacitive sensing is employed to detect gestures made within two or more respective zones 94, 96, 98 to determine an application which the gesture relates to, and to determine the function performed by the gesture. Here, a form of virtual crown may be provided which enables setting of, for example, the time, date, and a stopwatch, by means of detecting gestures in the different zones. For example, a twisting gesture made in the first zone 94 may represent adjusting the time using a time application, a twisting gesture made in the second zone 96 may represent adjusting the date using a date application, and a tap gesture made in the third zone may represent starting a timer using a stopwatch application, and so on.

FIG. 3 is a schematic diagram of components of either of the earbud 10 or the smartwatch 85 shown in FIGS. 1 and 2 respectively. For ease of explanation, we will assume that the components are those in the earbud 10, but it will be appreciated that the following is applicable to the smartwatch 85.

The earbud 10 may have a processor 100, a memory 104 closely coupled to the processor and comprised of a RAM 102 and ROM 103, an audio output 108, and a network interface 110. In the case of the smartwatch 85, a display and one or more hardware keys may be used, for example in place of the audio output 108. The earbud 10 may comprise one or more network interfaces 110 for connection to a network, e.g. using Bluetooth or similar. The processor 100 is connected to each of the other components in order to control operation thereof.

The memory 104 may comprise a non-volatile memory, a hard disk drive (HDD) or a solid state drive (SSD). The ROM 103 of the memory 104 stores, amongst other things, an operating system 112 and may store software applications 114. The RAM 102 of the memory 104 may be used by the processor 100 for the temporary storage of data. The operating system 112 may contain code which, when executed by the processor ware components of the earbud 10.

The processor 100 may take any suitable form. For instance, it may be a microcontroller, plural microcontrollers, a processor, or plural processors and it may comprise processor circuitry.

In some embodiments, the earbud 10 may also be associated with external software applications. These may be applications stored on a remote device 120 and may run partly or exclusively on the remote device. These applications may be termed, in some cases, cloud-hosted applications. The earbud 10 may be in communication with the remote device 120 in order to utilize the software application stored there.

For example, the earbud 10 may issue a signal to the remote device 120 which corresponds to a particular function of the application stored thereon. For example, a gesture indicative of a volume up or down may cause the earbud 10 to issue a signal corresponding to the relevant volume up or down function to the remote device 120. The remote device 120 is configured to decode or interpret the signal and perform the volume up or down function locally. The resulting audio may then be relayed to the earbud 10 at the appropriate volume. In other situations, for example in controlling some non-audio functionality, such as opening a health application on the remote device 120, no relaying is necessary.

FIG. 4 shows example functional elements of a data processing terminal 130 according to some embodiments. The data processing terminal 130 may for example be the earbud 10 or the smartwatch 85 shown in FIGS. 1 and 2 respectively.

The data processing terminal 130 comprises a capacitive proximity sensor 132, a proximity controller 134, a mapping database 136, an interaction layer 138, and an application stack 140 comprising a plurality of applications, e.g. two or more of a music playing application, a health monitoring application, a voice call application, a text or multimedia communications application, a speech-recognition application, a podcast application and so on.

These elements may be provided by software, firmware, hardware or any combination thereof. For example, the proximity controller 134 and interaction layer 138 may comprise a software application 114, stored on the memory 104 shown in FIG. 3.

Reference numeral 150 indicates the presence of a user's hand remote from the data processing terminal 130, which in use may be selectively positioned within one of three spatial zones R1, R2 and R3 represented by respective distance ranges.

The capacitive proximity sensor 132 may be any suitable sensor as mentioned above.

The proximity controller 134 may be configured to control assignment or association of three applications in the application stack 140 to the respective spatial zones R1, R2 and R3. These assignments are stored, and potentially updated from time-to-time, in the mapping database 136 which is shown schematically in FIG. 5.

Referring to FIG. 5, the mapping database 136 may comprise, or represent in any suitable form, an assignment table storing, for each range, a respective application. In the shown example, the nearest range which is set to be between 0.1-2 cm from the data processing terminal 130 is labelled R1, the next range which is set to be between 2-4 cm from the data processing terminal is labelled R2 and the next range which is set to be between 4-6 cm from the data processing terminal is labelled R3. R1 is assigned to a music application, R2 to a voice call (i.e. telephony) application, and R3 to a health application.

For each application, a plurality of gestures and their corresponding function for the application are also stored.

For example, for the music application, the gestures "tap", "vertical swipe" and "horizontal swipe" are assigned to "enable/play/pause", "volume up/down" and "next/previous track" respectively.

For example, for the voice calls application, the gestures "tap", "vertical swipe" and "horizontal swipe" are assigned to "enable/answer/end call", "volume up/down" and "next/previous contact" respectively.

For example, for the health application, the gestures "tap", "vertical swipe" and "horizontal swipe" are assigned to "enable/disable", "activity selector" and "date selector" respectively.

It will be appreciated that a greater or fewer number of applications, gestures and/or functions may be represented in the mapping database 136. It will also be appreciated that different gestures may be represented. For example, a gesture for determining a battery level of the data processing terminal may be provided.

The assignments shown in FIG. 5 may be factory set. The assignments may be fixed or may be updated. For example, the data processing terminal 130 may be provided with associated setup software either on a disc or downloadable from a website or even stored on the memory 404 for plug and play operation. The setup software may permit a user to make the assignments and/or manually update them. As will be discussed later on, the assignments may update dynamically over time. The ranges may also be adjusted by user control or dynamically, for example based on environmental factors.

Returning to FIG. 4, the interaction layer 138 operates responsive to detecting an object, e.g. the user's hand 150, within proximate range and within one of the ranges R1, R2 or R3. The interaction layer 138 queries the mapping database 136 to identify the application assigned to this range and the gesture. In the shown example, the second range R2 is identified and hence a voice call application is identified. This identification by the interaction layer 138 causes performance of the function associated with the gesture for the voice calls application (App2) in the application stack 140, e.g. answering a call responsive to a tap gesture.

In a subsequent stage, for example, the user may make an upwards swipe gesture in the same range R2. Responsive to this, the interaction layer 138 will cause an increase in volume of the voice call.

In a subsequent stage, for example, whilst the call is ongoing, the user may move their hand into the third range R3. This may result in an audio confirmation (e.g. if the data processing terminal 130 is an audio device) by playing an audio clip such as "health" to notify the user of said fact. The user may then make a tap gesture in the third range R3. Responsive to this, the interaction layer 138 will cause enablement of the health application without interrupting the voice call. In a subsequent stage, for example, the user may make a vertical swipe in the third range R3, and the interaction layer 138 will scroll through different activity types which is may, in the case of an audio device, be briefly notified as an audio confirmation, e.g. "walking."

Thus, applications that are hidden or disabled may be enabled without physical interaction.

In some embodiments, certain application functions may not be permitted, or may be modified, dependent on what function is currently running. For example, a gesture for playing a music track may not be permitted if a call is ongoing. Alternatively, the function may be modified dependent on the ongoing function, for example by readying the music track for playing as soon as the call is dropped.

In some embodiments, the correlation between ranges and application and/or gestures and functions may be stored elsewhere other than the mapping database 136. For example, the correlations may be stored in a separate database, on the interaction layer, or in a remote data terminal or server. The FIG. 4 arrangement is merely illustrative.

In some embodiments, one or more of the functional modules shown in the data processing terminal 130 (other than the capacitive sensor 132) may be provided in a separate data processing terminal such as a smartphone or tablet computer. In this respect, the separate data processing terminal may receive the sensing signal from the capacitive sensor 132 and perform the steps to be outlined below, although for ease of explanation we will assume in the following that they are performed in the data processing terminal 130 itself.

Figure 6:
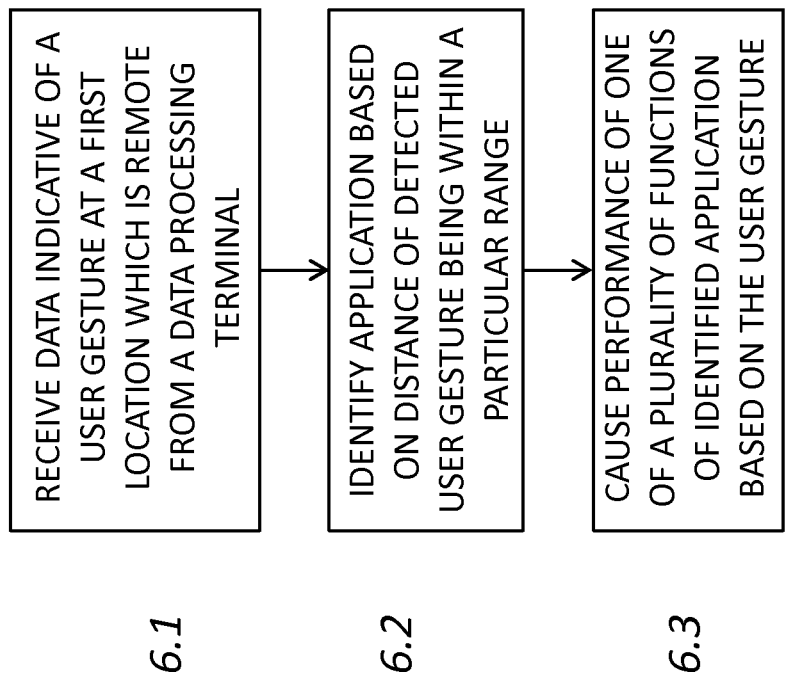
FIG. 6 is a flow diagram of operations performed at the FIG. 1 or FIG. 2 apparatuses according to some embodiments.

FIG. 6 is a flow diagram illustrating example processing operations that may be performed by the data processing terminal 130. Certain operations may be omitted or replaced with others.

A first operation 6.1 comprises receiving data indicative of a detected user gesture at a first location which is remote from a data processing terminal 130.

Another operation 6.2 comprises identifying an application based on distance of the detected user gesture being within a particular range.

Another operation 6.3 comprises causing performance of one of a plurality of functions of the identified application based on the user gesture.

Figure 7:
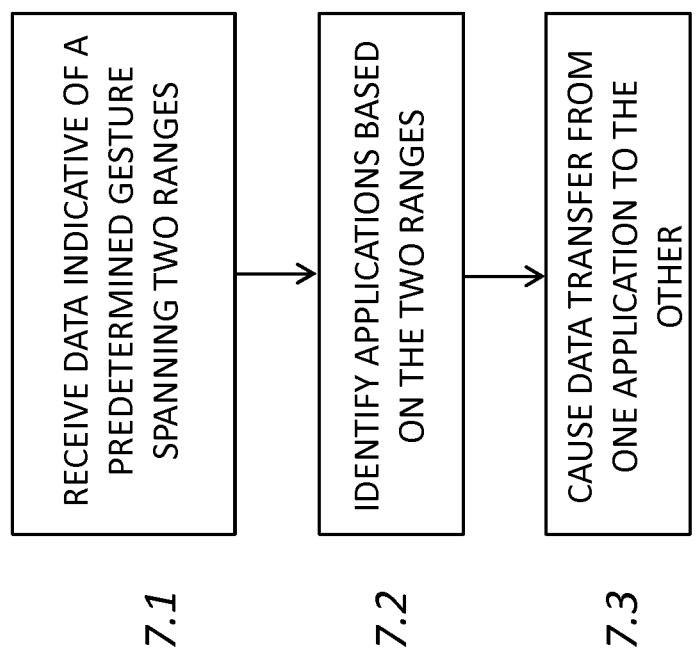
FIG. 7 is a flow diagram of operations performed at the FIG. 1 or FIG. 2 apparatuses for data sharing between applications, according to some embodiments.

FIG. 7 is a flow diagram illustrating example processing operations that may be performed by the data processing terminal 130 in another embodiment.

A first operation 7.1 comprises receiving data indicative of a detected user gesture spanning two distance ranges.

A second operation 7.2 comprises identifying two applications based on the two ranges.

A third operation 7.3 comprises causing a data transfer from one of the applications to the other applications.

In this embodiment, a predetermined gesture that spans two, or potentially more, distance ranges may be interpreted to cause data sharing between the two corresponding applications, where available.

Figure 8:
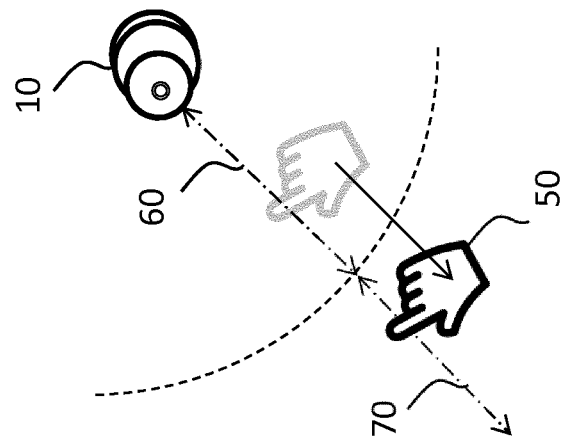
FIG. 8 is a schematic view of the first apparatus and a gesture representing a share operation for detection at the first apparatus for performance of the FIG. 7 method.

For example, FIG. 8 shows the FIG. 1 earbud 10 having the two ranges 60, 70 and a user gesture 50 that starts in the first (closest) range and moves to the second range in a sideways swiping motion. The particular 'share' gesture may correspond to a share, copy or move function of the particular application. The particular 'share' gesture may require a particular start gesture and a particular end gesture, to prevent the share function being applied to unintended applications in outer ranges.

For example, the first application associated with the first range 60 may be a music application and the second application associated with the second range 70 may be voice calls application. In this respect, the share gesture may cause a currently playing or selected music track in the first application being shared with the second application so that the music track is used as the ringtone for the second application.

In another example, the first application may be a multimedia application and the second application may be a text messaging application. The sharing gesture may cause a currently selected multimedia entity being entered into a text message.

In another example, the first application may be a network setup application and the second application may be an application requiring network settings, e.g. proxy settings. The sharing gesture may cause sharing of the network settings between the two applications.

Numerous other examples may be envisaged, for example simple file transfers between applications.

In this situation, the share gesture may be associated with a share, copy or move function of the first application and a share, paste or download function of the second application.

Figure 9:
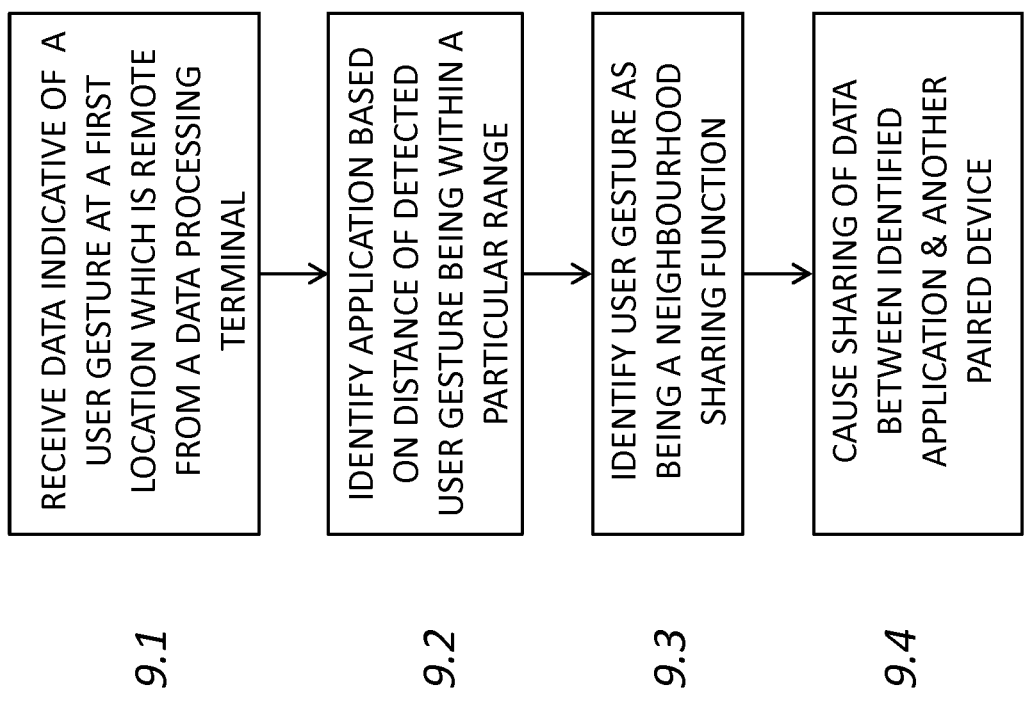
FIG. 9 is a flow diagram of other operations performed at the FIG. 1 or FIG. 2 apparatuses for data sharing between an application of the first apparatus and another apparatus, according to some embodiments.

FIG. 9 is a flow diagram illustrating example processing operations that may be performed by the data processing terminal 130 in another embodiment.

A first operation 9.1 comprises receiving data indicative of a detected user gesture at a first location which is remote from a data processing terminal 130.

A second operation 9.2 comprises identifying an application based on the distance of the detected user gesture being within a particular range.

A third operation 9.3 comprises identifying the user gesture as being a neighbourhood sharing function.

A fourth operation 9.4 comprises causing sharing of data between the identified application and another device in proximity; The other device may be paired with the current device, but this is not essential.

In this embodiment, a predetermined gesture that is indicative of neighbourhood sharing may permit data to be shared between different but proximate devices which are not otherwise physically connected. The predetermined gesture may comprise a start gesture and an end gesture.

Figure 10:
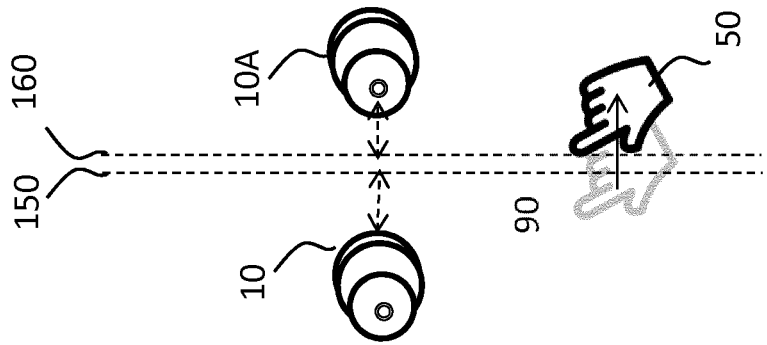
FIG. 10 is a schematic view of the first apparatus and a gesture representing a share operation for detection at the first and the other apparatus for performance of the FIG. 9 method.

For example, FIG. 10 shows the FIG. 1 earbud 10 and a second earbud 10A, which may belong to a different person. The dotted lines 150, 160 indicate the range of their respective first ranges, in this example. A user gesture 50 that starts in the first range 150 of the first earbud 10 and ends in that 160 of the second earbud 10A may cause inter-device sharing such that, for example, a music track being played or selected on the first earbud is transferred to the second earbud 10A. In this case, the neighbourhood sharing gesture may be associated with a share, copy or move function of the first earbud function and a share, paste or download function of the second earbud function.

In some embodiments, the different distance ranges may partially overlap, although this may require the functional gestures of one corresponding application to be distinct from those of the other corresponding application, in order that a gesture made in the overlapping zone is not incorrectly interpreted.

As mentioned previously, although embodiments mainly assume that the detection, identification and function causing stages occur in the wearable apparatus, they could be performed in an associated other apparatus such as a smartphone or tablet computer which receives the data indicative of the gesture from the wearable apparatus, and relays the result of the performed function back to the wearable apparatus, such as by changing a music track or increasing the volume.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. An apparatus, comprising:
at least one processor; and
at least one memory including computer program code, the at least one memory and the computer program code configured to, with the at least one processor, cause the apparatus at least to perform:
receiving data indicative of (i) a detected user gesture and (ii) a distance between the detected user gesture and one or more sensors on a wearable device, wherein the wearable device is communicatively connected to a remote device on which a plurality of applications are stored and operative;
identifying (i) a first application, responsive to the distance of the detected user gesture being within a first distance range from the wearable device, or (ii) the first application and a second application responsive to the distance of the detected user gesture spanning at least a portion of the first distance range from the wearable device and at least a portion of a second distance range from the wearable device, wherein the plurality of applications are associated with different distance ranges from the wearable device and a plurality of user gestures are associated with a plurality of functions for respective ones of the plurality of applications in the different distance ranges, wherein the association between different ones of the plurality of applications and the different distance ranges is based on user selection; and
selecting, responsive to the detected user gesture spanning at least the portion of the first distance range from the wearable device and at least the portion of the second distance range from the wearable device, one of a plurality of functions of the first application or the second application, wherein the plurality of functions comprise at least a sharing function that is initiated between the first application and the second application;
causing performance of the selected one of the plurality of functions based on the detected user gesture.

2. The apparatus of claim 1, the at least one memory and the computer program code being further configured to, with the at least one processor, cause the apparatus at least to perform:
detecting another remote user gesture at a distance within a second range from the wearable device;
identifying a second application, different from the first application, based on the distance being within the second range; and
causing performance of one of a plurality of functions of the second application based on the user gesture.

3. The apparatus of claim 1, wherein the different distance ranges are substantially non-overlapping.

4. The apparatus of claim 1, wherein causing performance of the one of said plurality of functions comprises identifying a type of the detected user gesture and determining which of a plurality of predetermined functions associated with the identified application correspond to said identified gesture type, which determined function is then caused to be performed.

5. The apparatus of claim 1, wherein in the event that a predetermined gesture moves from the first distance range, into a different distance range, a data transfer function is performed between the associated applications.

6. The apparatus of claim 1, wherein in the event that a predetermined gesture corresponds to a sharing function, a data transfer function is performed between the first application and the second application, wherein the second application is associated with remote device in proximity with which the wearable device is paired.

7. The apparatus of claim 1, wherein the association between different ones of the plurality of applications and the different distance ranges is updated dynamically.

8. The apparatus of claim 7, wherein the association is dynamically updated by assigning to a predetermined one of the different distance ranges the most frequently and/or recently used application.

9. The apparatus of claim 8, wherein the predetermined one of the different distance ranges is that which is closest to the wearable device.

10. The apparatus of claim 1, wherein the apparatus is the wearable device.

11. The apparatus of claim 10, wherein causing performance of the selected one of the plurality of functions comprises issuing a corresponding instruction to the remote device to which the wearable device is proximate and with which the wearable device is paired.

12. The apparatus of claim 1, wherein the wearable device comprises one of an earphone, headphones and watch.

13. The apparatus of claim 1, wherein the first application is identified via an interaction layer querying a mapping to identify the application assigned to the detected user gesture in the first distance range, and wherein the mapping comprises a plurality of the different distance ranges.

14. The apparatus of claim 1, wherein the different distance ranges are overlapping.

15. The apparatus of claim 1, wherein the wearable device comprises an earphone.

16. The apparatus of claim 1, further configured to perform:
cause an audio confirmation of the selected one of the plurality of functions based on the detected user gesture.

17. The apparatus of claim 1, wherein the at least one memory and the computer program code are further configured to, with the at least one processor, cause the apparatus at least to perform:
responsive to the detected user gesture spanning at least the portion of the first distance range from the wearable device and at least the portion of the second distance range from the wearable device, performing a data transfer function between the first application and the second application.

18. A method comprising:
receiving data indicative of (i) a detected user gesture and (ii) a distance between the detected user gesture and one or more sensors on a wearable device, wherein the wearable device is communicatively connected to a remote device on which a plurality of applications are stored and operative;
identifying (i) a first application, responsive to the distance of a detected user gesture being within a first distance range from the wearable device, or (ii) the first application and a second application responsive to the distance of the detected user gesture spanning at least a portion of the first distance range from the wearable device and at least a portion of a second distance range from the wearable device, wherein the plurality of applications are associated with different distance ranges from the wearable device and a plurality of user gestures are associated with a plurality of functions for respective ones of the plurality of applications in the different distance ranges, wherein the association between different ones of the plurality of applications and the different distance ranges is based on user selection;
selecting, responsive to the detected user gesture spanning at least the portion of the first distance range from the wearable device and at least the portion of the second distance range from the wearable device, one of a plurality of functions of the first application or the second application, wherein the plurality of functions comprise at least a sharing function that is initiated between the first application and the second application; and
causing performance of the selected one of the plurality of functions of the first application based on the detected user gesture.

19. A non-transitory computer readable medium comprising program instructions stored thereon for performing at least the following:
receive data indicative of (i) a detected user gesture and (ii) a distance between the detected user gesture and one or more sensors on a wearable device, wherein the wearable device is communicatively connected to a remote device on which a plurality of applications are stored and operative;
identify (i) a first application, responsive to the distance of the detected user gesture being within a first distance range from the wearable device, or (ii) the first application and a second application responsive to the distance of the detected user gesture spanning at least a portion of the first distance range from the wearable device and at least a portion of a second distance range from the wearable device, wherein the plurality of applications are associated with different distance ranges from the wearable device and a plurality of user gestures are associated with a plurality of functions for respective ones of the plurality of applications in the different distance ranges, wherein the association between different ones of the plurality of applications and the different distance ranges is based on user selection;
select, responsive to the detected user gesture spanning at least the portion of the first distance range from the wearable device and at least the portion of the second distance range from the wearable device, one of a plurality of functions of the first application or the second application, wherein the plurality of functions comprise at least a sharing function that is initiated between the first application and the second application; and
cause performance of the selected one of the plurality of functions of the first application based on the detected user gesture.

* * * * *